US007827228B2

(12) United States Patent
Emberton et al.

(10) Patent No.: US 7,827,228 B2
(45) Date of Patent: Nov. 2, 2010

(54) METHODS AND SYSTEMS FOR NON-INTERRUPTING NOTIFICATIONS

(75) Inventors: Richard Emberton, Kirkland, WA (US); Richard Bernard Wright, Castro Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 603 days.

(21) Appl. No.: 10/510,196

(22) PCT Filed: Mar. 29, 2003

(86) PCT No.: PCT/US03/10099

§ 371 (c)(1),
(2), (4) Date: Jun. 21, 2005

(87) PCT Pub. No.: WO03/083603

PCT Pub. Date: Oct. 9, 2003

(65) Prior Publication Data

US 2006/0259537 A1    Nov. 16, 2006

(51) Int. Cl.
*G06F 15/16* (2006.01)
(52) U.S. Cl. .................. 709/201; 709/202; 709/203; 709/224; 709/206; 705/34; 705/35
(58) Field of Classification Search ......... 709/201–207, 709/224; 705/40, 34–35
See application file for complete search history.

(56) References Cited

U.S. PATENT DOCUMENTS

| 5,862,325 | A |   | 1/1999 | Reed et al. |         |
|-----------|---|---|--------|-------------|---------|
| 6,021,397 | A | * | 2/2000 | Jones et al. | 705/36 R |
| 6,182,078 | B1 | * | 1/2001 | Whitmyer, Jr. | 707/10 |
| 6,457,076 | B1 | * | 9/2002 | Cheng et al. | 710/36 |
| 7,031,940 | B2 | * | 4/2006 | Shigemi et al. | 705/40 |
| 7,194,437 | B1 | * | 3/2007 | Britto et al. | 705/40 |
| 7,346,543 | B1 | * | 3/2008 | Edmark | 705/26 |
| 2002/0013711 | A1 |   | 1/2002 | Ahuja et al. |  |
| 2002/0052841 | A1 | * | 5/2002 | Guthrie et al. | 705/40 |
| 2002/0161699 | A1 | * | 10/2002 | Okamoto et al. | 705/38 |
| 2003/0036999 | A1 | * | 2/2003 | Mirlas et al. | 705/40 |

(Continued)

FOREIGN PATENT DOCUMENTS

JP    2001-014400    1/2001

(Continued)

OTHER PUBLICATIONS

Office Action mailed Jan. 28, 2009 in related Canadian application 2,480.078.

(Continued)

*Primary Examiner*—Nathan Flynn
*Assistant Examiner*—Mohammad A Siddiqi
(74) *Attorney, Agent, or Firm*—Townsend and Townsend and Crew LLP

(57) ABSTRACT

A method of processing notifications issued by computer processes, each notification notifying the user of a business event that requires the user to take an action. The notifications are received and links may be displayed to notifications that are selected according to selected characteristics. When the user selects a displayed link, the corresponding notification may be displayed. The user may take an action relative to the displayed notification without accessing the computer process that issued the notification and a reply that includes an indication of the action taken by the user may then be generated and sent.

15 Claims, 7 Drawing Sheets

U.S. PATENT DOCUMENTS

2003/0208441 A1* 11/2003 Poplawski et al. ............ 705/40
2007/0174448 A1* 7/2007 Ahuja et al. ................ 709/224

OTHER PUBLICATIONS

Notice of Acceptance mailed Jan. 31, 2008, in corresponding Australian Application No. 2003226203.

JP Office Action of Mar. 19, 2009 in corresponding JP Application 580965/2003.

Alan Zeichick, SD Times, "SQL Server Gets New Class of Notifications: Jul. 15, 2002—Microsoft Corp. ios readying a notification service add-in to its SQL Server 2000 relational database that it says provides a means for extending enterprise data out from the DBMS to external users." Printed Jul. 29, 2002.

* cited by examiner

Search [                    ]    Keyword [                    ] Go

Home / Individual / Work

Stocks — More Customize
- ANT (NYSE)     95 5/8
- XYZ (NYSE)     88 1/2
- YNASN (NASDAQ) 9 1/4
- VLLY (NASDAQ)  23 9/16

✉ Notices — More Customize — 114

| | | |
|---|---|---|
| Butano, Jim Direct Deposit of Expense Reimburs... | Requisition | Sent 10/15/03 2:00 PM |
| Purchase Requisition 778635 has been approved | Requisition | Sent 10/14/03 1:43 PM |
| Requisition 454498 has been forwarded to Nute, Ma... | Requisition | Sent 10/14/03 9:10 AM |
| Expense Report W32480459 has been approved | Expenses | Sent 10/14/03 8:32 AM |
| Expense Report W2139213 has been rejected | Expenses | Sent 10/13/03 8:05 AM |
| PO#13212 Created/Altered for ABC computers | | |
| Requisition 3126878 requires your approval | Requisition | Sent 10/10/03 4:34 PM |
| Purchase Requisition 34587978 has been rejected | Requisition | Sent 10/09/03 2:56 PM |
| | Requisition | Sent 10/08/03 3:15 PM |

112

⚡ Favorites — More Customize
- 2003 North American Auto Show
- Auto.com: Daily News
- Auto-xchange.com
- www.a-me.com

🌐 News — More Customize
- New York Int'l Auto Show 2003
- Automotive News
- All hands for Q4 at Café Ben Celebration successful Q4 Results
- AutoQ announces general availability of Xt-4- SUV
- Open Enrollment Starts on October 15th

NOTICES

View

Select Items and...

[All Open Notices] — 304

[Go] [Open] [Approve] [Disapprove]

[Customize] — 302

▼ Previous    1 of 9 shown of 9    Next ▲ — 301

| Select | Subject | Sent | Due | Priority |
|---|---|---|---|---|
| ☐ | Reminder: Your password will expire in 5 days | 21-SEPT | 01-OCT | High |
| ☐ | Requisition 234323 New Copier for $4500 requires your approval | 20-SEPT | 01-OCT | Normal |
| ☐ | Reminder: Requisition 367498 New Copier for $500 | 20 SEPT | 21-SEPT | High |
| ☐ | Requisition 4395430, Office Furniture for $900 has been rejected | 18-SEPT | 29-SEPT | Normal |
| ☐ | Expense Report 87979, Client Visit requires your approval | 18-SEPT | 29-SEPT | Normal |
| ☐ | ShortPay of expense report 234275 due to missing receipts | 18-SEPT | 29-SEPT | Normal |
| ☐ | Expense Report 2343289,Travel Expenses requires your approval | 15-SEPT | 19-SEPT | Normal |
| ☐ | Meeting reschedule, Monday staff moved to Tuesday | 15-SEPT | 18-SEPT | Normal |
| ☐ | Survey: Please provide feedback regarding your storage needs | 15-SEPT | 28-SEPT | Normal |

Tabs: Home / Individual / Work — 120

Subject: Expense Report W9082452352 for Dough, Argent requires your approval
Date: Wed 13 Feb. 2003 05:04:00 (PST)
From: Notification System <notice webapp.acme.com>
To: John Smith@acme.com

SMITH, JOHN

This expense report requires your approval.
Expense Report Purpose: Attendance at UML Workshop
The total of the new expense is $534.23

Click on one of the following choices to generate an e-mail response

Choices:   Approved   Disapproved
             502         504

*FIG. 5*

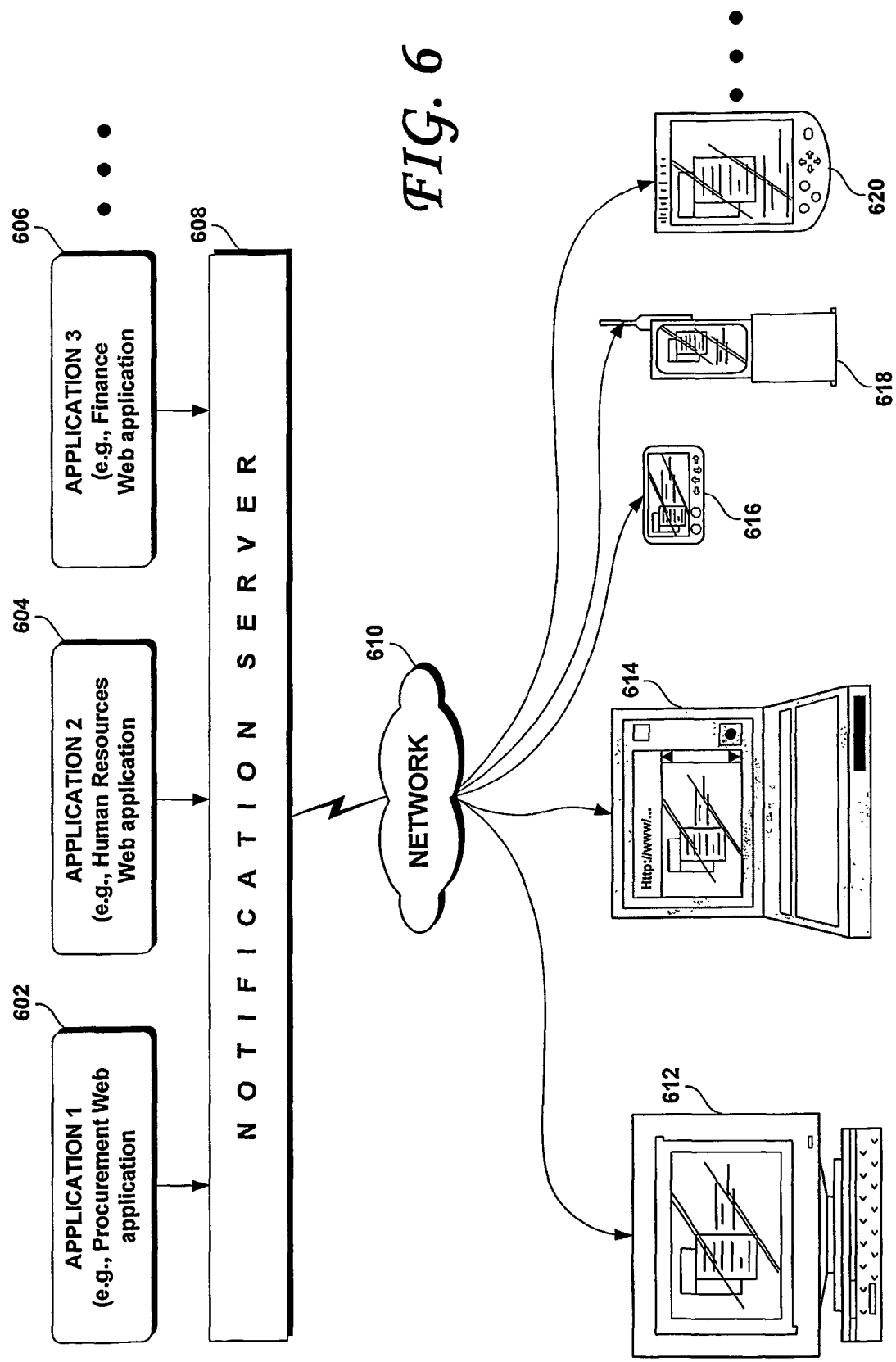

METHODS AND SYSTEMS FOR NON-INTERRUPTING NOTIFICATIONS

BACKGROUND OF THE INVENTION

1. Field of the Invention

The present invention generally relates to notices and alerts generated by applications. In particular, the embodiments of the present invention relate to methods and systems for generating, sending and responding to non-interrupting notices.

2. Description of the Related Art

The efficiency of today's complex work environments depends upon the multi-functioning capacity of computers. For example, agents and processes that run in the background allow users to multitask. Many secondary tasks can operate independently while the user concentrates on a primary task. However, the ability to multitask does not automatically make users more efficient. For example, while email and phones are useful, they frequently cause interruptions, distract the user and hinder task completion.

Increases in computing power and smarter applications that work in the background have led to an increase in the number of alerts and notifications received by users. Intelligent agents and processes are inherently limited in their abilities and can only work in the background up to a point. At some stage, these backend processes require some level of interaction with the user (i.e., task success, task failure, request for input). However, users frequently interpret an unanticipated demand for attention by a backend process as an unwelcome interruption.

Increased computing power allows individuals to alternate between primary and secondary tasks. While multi-tasking can increase productivity, cognitive limitations often prevent people from fully attending to more than one task simultaneously. It is the unexpected interruptions of the primary task by a secondary task that leads to a decrease in the user's productivity in carrying out both the primary and secondary tasks.

It has been shown that interruptions not only slow down task performance and but can also increase errors during the execution of the primary task. Another negative outcome of an interruption is that the user may not pay adequate attention to the content of the interruption. This may happen when the user is interrupted during intense focus on a primary task or when the interruption (i.e., notification) is perceived as a false alarm (e.g., a bogus error message). In such cases, the user may not pay enough attention to the interruption to understand its content. This could have serious consequences if the notification contains important, time-critical information such as, for example, a notice of immediate system shutdown.

The increase in the number of interruptions experienced by users during computer use has sparked extensive research on the detrimental effects of interruptions and ways to mitigate their effects. The majority of these research efforts have focused on determining the factors that affect the impact of an interruption. These studies have determined that the impact of an interruption and the user's ability to recover therefrom can be affected by a variety of factors such as, for example, the specific stage of the task during which the interruption occurred, the relatedness of the secondary (interrupting) task to the primary task, and the type of tasks being performed. Researchers have also examined aspects of interface design that may facilitate a faster recovery from an interruption and a faster resumption of an interrupted primary task.

Although interruptions may decrease the user's productivity, they often serve a vital purpose (e.g., fire alarms, notices of imminent system failure). Nevertheless, some researchers have suggested the development of an interface design for delivering interruptions that would not demand the user's attention. This is believed to be a misplaced effort as it removes a key component of an interruption.

Another proposed solution to this problem is a continually updating task bar placed on the side of the computer screen to notify users. This peripheral notification design is less distracting than an alert based design, in which a graphical notification overlays content at the center of a user's screen and requires a user to take action to remove the overlay. However, the continuous movement in the user's peripheral vision field incident to updates of the task bar may distract the user. There has been a long felt need, therefore, to design an interface that provides notices related to secondary tasks without interrupting the primary task and that allows the user to efficiently and effectively perform both tasks.

Conventional methods and systems for sending and responding to alerts and notifications generated from applications required the user to receive the notification (often disturbing the user from his or her primary task), stop his or her current task and log onto the notification issuing application, respond to the notification and return to his or her primary task. It may be appreciated, therefore, that less disruptive methods and systems for receiving and responding to an ever-increasing number of notifications are needed. Such less disruptive methods and systems would increase the user's productivity by enabling the user to remain on task for a greater period of time, with the minimum of interruption, all the while attending to notices in a timely and ordered manner.

SUMMARY OF THE INVENTION

The present invention, according to an embodiment thereof, is a method of processing notifications issued by a plurality of computer processes, each of the notifications notifying the user of a business event that requires the user to take at least one predetermined action, the method comprising the steps of: receiving the notifications; displaying links to selected ones of the received notifications to the user, the displayed links being selected according to at least one characteristic of the received notification; when the user selects one of the displayed links, displaying the received notification that corresponds to the selected link; enabling the user to take the at least one predetermined action relative to the displayed notification without accessing the computer process that issued the notification; generating a reply to the displayed notification, the reply including an indication of the action taken by the user, and sending the reply to the computer process that issued the displayed notification.

The link displaying step may display links corresponding to a selectable subset of the received notifications. The link displaying step may display the links in a portal, for example. The displaying steps may be carried out on a mobile device (telephone, pager, PDA and the like). The displaying step may be carried out by a computing device coupled to the plurality of computer processes by a computer network. The link displaying step may display a link to each or selected ones of the received notifications.

According to another embodiment thereof, the present invention is a computer system for processing notifications issued by a plurality of computer processes, each of the notifications notifying the user of a business event that requires the user to take at least one predetermined action, comprising: at least one processor; at least one data storage device; a plurality of processes spawned by said at least one processor, the processes including processing logic for: receiving the notifications; displaying links to selected ones of the received notifications to the user, the displayed links being selected according to at least one characteristic of the received notification; when the user selects one of the displayed links, displaying the received notification that corresponds to the selected link; enabling the user to take the at least one predetermined action relative to the displayed notification without accessing the computer process that issued the notification; generating a reply to the displayed notification, the reply including an indication of the action taken by the user, and sending the reply to the computer process that issued the displayed notification.

According to still another embodiment, the present invention is a machine-readable medium having data stored thereon representing sequences of instructions which, when executed by computing device, causes said computing device to process notifications issued by a plurality of computer processes, each of the notifications notifying the user of a business event that requires the user to take at least one predetermined action, by performing the steps of: receiving the notifications; displaying links to selected ones of the received notifications to the user, the displayed links being selected according to at least one characteristic of the received notification; when the user selects one of the displayed links, displaying the received notification that corresponds to the selected link; enabling the user to take the at least one predetermined action relative to the displayed notification without accessing the computer process that issued the notification; generating a reply to the displayed notification, the reply including an indication of the action taken by the user, and sending the reply to the computer process that issued the displayed notification.

The present invention may also be viewed as a method for a mobile device to process notifications issued by a plurality of computer processes, each of the notifications notifying the user of a business event that requires the user to take at least one predetermined action, the method comprising the steps of: receiving the issued notifications from a notification server, the notification server being in communication with the plurality of processes and the mobile device; providing links to selected ones of the received notifications to the user on the mobile device; when the user of the mobile device selects one of the provided links, displaying on the mobile device the received notification that corresponds to the selected link; enabling the user to take the at least one predetermined action on the mobile device relative to the displayed notification without accessing the computer process that issued the notification; generating a reply to the displayed notification, the reply including an indication of the action taken by the user, and sending the reply to the computer process that issued the displayed notification.

The link providing step may provide links corresponding to a selectable subset of the received notifications. The link providing step may display the links in a portal (or another form of Web interface for example) accessible to the mobile device and to the user. The link providing step may provide a link to each of the received notifications.

The present invention is also, according to another embodiment thereof, a mobile device configured to process notifications issued by a plurality of computer processes, each of the notifications notifying the user of a business event that requires the user to take at least one predetermined action, comprising: at least one processor; at least one data storage device; a plurality of processes spawned by said at least one processor, the processes including processing logic for: receiving the issued notifications from a notification server, the notification server being in communication with the plurality of processes and the mobile device; providing links to selected ones of the received notifications to the user; when the user of the mobile device selects one of the provided links, displaying the received notification that corresponds to the selected link; enabling the user to take the at least one predetermined action on the mobile device relative to the displayed notification without accessing the computer process that issued the notification; generating a reply to the displayed notification, the reply including an indication of the action taken by the user, and sending the reply to the computer process that issued the displayed notification.

The mobile device may be or include a telephone, a personal digital assistant and/or a pager, for example (or a device that includes such functionality). The link providing step may provide links corresponding to a selectable subset of the received notifications. The link providing step may display the links in a portal (for example) accessible to the mobile device and to the user. The link providing step may provide a link to each of the received notifications.

The present invention, according to still another embodiment thereof, is a machine-readable medium having data stored thereon representing sequences of instructions which, when executed by a mobile, causes said mobile to process notifications issued by a plurality of computer processes, each of the notifications notifying the user of a business event that requires the user to take at least one predetermined action, by performing the steps of: receiving the issued notifications from a notification server, the notification server being in communication with the plurality of processes and the mobile device; providing links to selected ones of the received notifications to the user; when the user of the mobile device selects one of the provided links, displaying the received notification that corresponds to the selected link; enabling the user to take the at least one predetermined action on the mobile device relative to the displayed notification without accessing the computer process that issued the notification; generating a reply to the displayed notification, the reply including an indication of the action taken by the user, and sending the reply to the computer process that issued the displayed notification.

BRIEF DESCRIPTION OF THE DRAWINGS

For a further understanding of the objects and advantages of the present invention, reference should be had to the following detailed description, taken in conjunction with the accompanying figures, wherein:

FIG. 2 shows an exemplary Web portal including a portlet that contains notices, according to an embodiment of the present invention.

FIG. 3 shows an exemplary Worklist accessed through a Web portal, according to an embodiment of the present invention.

FIG. 5 is an exemplary notice within an Email message body, according to an embodiment of the present invention.

FIG. 6 is a representation of a system for non-interrupting notifications, according to an embodiment of the present invention.

DESCRIPTION OF THE INVENTION

Functional Description

Figure 1:
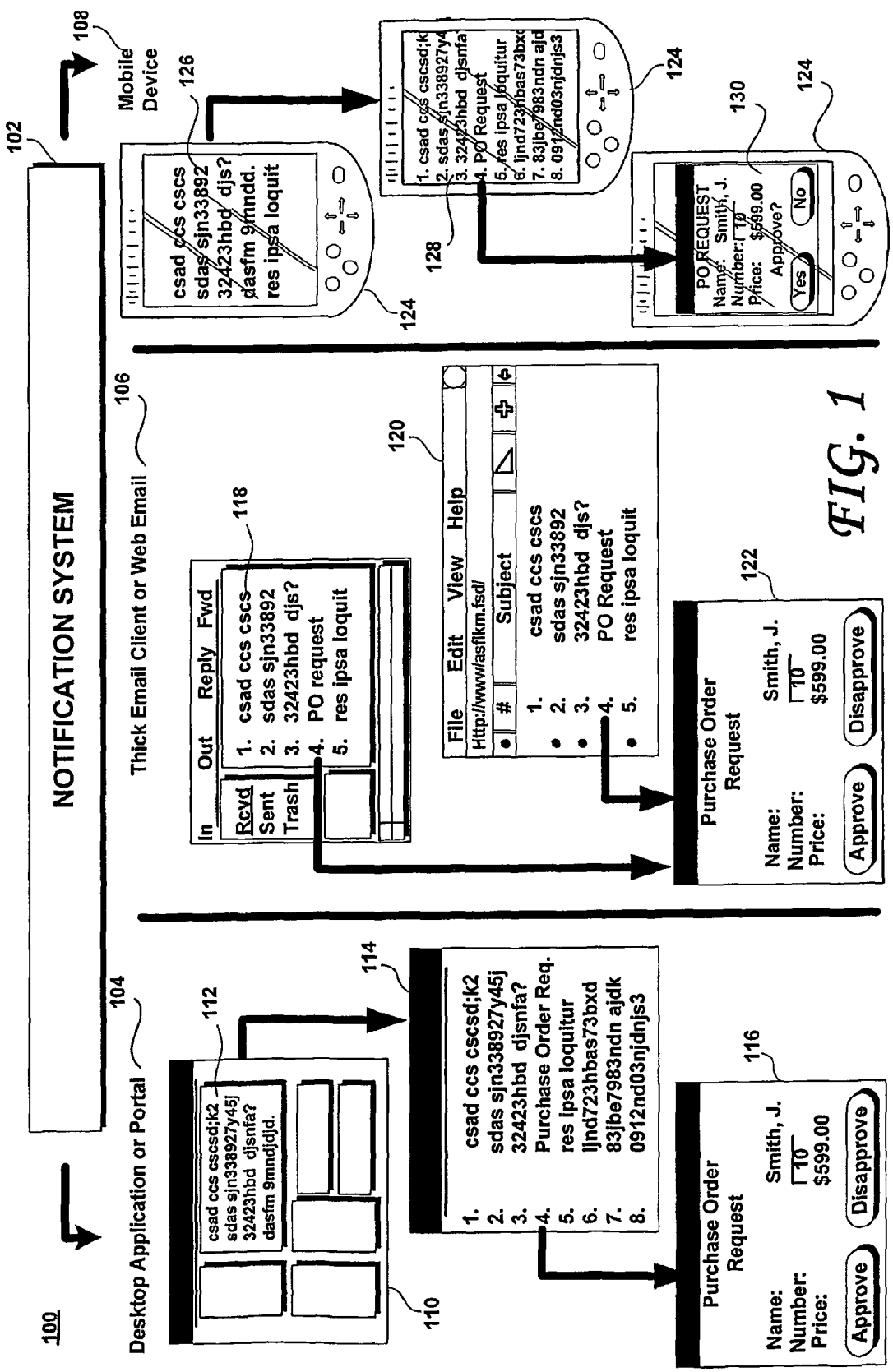
FIG. 1 is a representation of a passive notification design framework, according to an embodiment of the present invention.

Herein, it is useful to distinguish between different types of notifications. A notification does not necessarily have to interrupt the user. Notifications may be categorized as either active (i.e., alerts) or passive (i.e., notices). Alerts should interrupt the primary task due to the critical nature of the message content. Notices should not interrupt, as they are not time sensitive or critical, as users may defer examination of the notice to a later time without negative consequences. Indeed, the primary feature of a properly delivered notice according to embodiments of the present invention is that a properly delivered notice does not interrupt the user while the user is performing another task. This type of notification is not intrusive and not detrimental to the performance of other tasks because the user's attention is not demanded and because the notice is available to the user whenever the user decides to attend to it.

A new design framework for passive notifications is presented herein that addresses the problem of increased interruptions resulting from the escalation of multitasking in the modern work environment. Such a framework, according to embodiments of the present invention, may advantageously possess one or more of the three critical attributes of passivity, ubiquity and progressive disclosure. The present design framework possesses these required attributes and allows users to handle the interaction requirements of secondary tasks without detriment to their performance on the primary task and without inhibiting their ability to respond to secondary task notifications. Advantageously, the present design for passive notifications may be configured for a multitude of application types and platforms, including desktop client applications, mobile applications and Web-based applications and interfaces, for example.

Passivity

Within the context of the present invention, passivity means that the present non-interrupting notification systems are preferably user-driven as opposed to system-driven. According to embodiments of the present invention, the user determines when to request (e.g., pull) notification as opposed to the system determining when to interrupt (e.g., push) or notify the user. For example, a Web portal or Web mail is passive by virtue of the fact that the UI may be rendered in an HTML or other markup language page. The user has to affirmatively go to the page on which the notifications appear, as opposed to the notifications interrupting the user. Such notifications are believed to be less disruptive than interrupting notifications, since they do not occur while the user is in the middle of a task. It is also believed that passive notifications according to embodiments of the present invention will not degrade the user's performance of other tasks, as it is the users that control when to act on a notification. Such a notification design framework may be characterized as being user driven as opposed to system driven.

Ubiquity

Ubiquity is another important attribute of the notification design framework according to embodiments of the present invention. As non-interrupting notices according to embodiments of the present invention do not (by definition) interrupt the user, such notices, to be effective, must be conveniently obtainable when the user wishes to view and act upon them. These notices, when rendered and/or acted upon by the user, then become the user's primary task. This requires that the notices be available in a single easily accessible location even if the user is away from their desk or only able to access the Internet via a mobile device, Web mail or other device or service. According to embodiments of the present invention, such non-interrupting notices may be rendered in a Web portal, Web email, native email (i.e., thick email client), web application or all. The ability to render the notifications in email formal is significant, as email is quickly becoming a task management system for many people. Web portals, Web email, and native email systems incorporating the functionality disclosed herein aggregate all the information a user requires or receives, respectively, in a single location. Users do not have to search multiple locations to check for or respond to email messages or notices. This is one aspect of ubiquity that Web portals, Web mail, and native email have according to embodiments of the present invention possess. The other aspect of ubiquity possessed by the present invention is the inherent attribute of both Web portals and Web mail being on the Web. Notifications pushed to Web portals and to Web email may be accessed anywhere in the world as long as the user has access to a Web browser and the Internet. According to aspects of the present invention, depending on the markup language (e.g., HTML, XML, xHTML, WML, HDML and the like), the same information could be made available to Web browsers on desktops or mobile devices (e.g., PDAs, phones, pagers and the like), thus providing a more ubiquitous delivery platform than a desktop application alone. The ability to expand to a variety of platforms and mobile devices, both existing and to be developed, is another important attribute of the design framework according to embodiments of the present invention.

Progressive Disclosure

It has been shown that progressive disclosure reduces the user's cognitive load. It has also been suggested that extraneous information appearing on the user's display distracts the user from the main task by drawing attention to subsidiary, irrelevant or less relevant activities and also by cluttering the visual appearance of the user interface. The progressive disclosure of notifications according to embodiments of the present invention addresses the problems posed by the wide variety of communication devices (i.e., phones, PDAs) that are inherently limited in terms of display real estate. Progressive disclosure according to aspects of the present invention allows users to control the amount of information regarding their notifications and the level of detail thereof appearing on the screen at any given time. Such progressive disclosure according to embodiments of the present invention enables the user to make an informed decision within the limitations of the device on which the notifications are currently viewed.

Design Framework

FIG. 1 is a representation of a passive notification design framework that is ubiquitous, passive, and that provides for multiple levels of progressive disclosure, according to an embodiment of the present invention. In the embodiment of FIG. 1, the notification system 100 allows agents and processes to run independently in the background, sending messages to a notification system 102 that serves messages generated by such agents and processes in such a manner as to allow users to focus on whatever primary tasks currently occupies the users' attention. This design framework allows the notification system 102 to send messages to a native desktop application or portal, as shown at 104, to a thick email client or Web mail application 106 and/or to one or more of the users' mobile devices 108 (such as pagers, PDAs, mobile phone and the like). That the notification system sends notifications to the desktop applications or portals 104, thick email client or Web mail 106 and to mobile devices 108 renders the delivery of the user's messages ubiquitous, as such notices may be delivered to all or selected ones of the user's sources of electronic information. Indeed, the exemplary design framework of FIG. 1 enables the notification system 102 to send the same message or notification simultaneously or sequentially to all client applications: Web portal, Web mail, and native email application and to any or all of the user's mobile devices. In fact, the embodiment shown in FIG. 1 provides an added convenience since the user would not have to consult, for example, the email system to retrieve messages and the Web portal to retrieve notices. The email system and the Web portal may aggregate both types of messages, as may the user's mobile devices.

The application that generates the notification may present the generated notification to the user of the application once the user is properly authenticated. However, according to embodiments of the present invention, the user need not log into or otherwise directly access the application that generated the notification to receive and to substantively act upon the notification. As shown at in FIG. 1, the notification may advantageously be sent to a Web portal 110, which is an aggregation of information that is relevant to the user. Such portals 110 may be generally available anywhere where the user has access to a Web browser and a suitable network such as the Internet. Upon authenticating the user, the portal 110 may display a plurality of windows, each of which may contain static information and/or links to information that is relevant to the user or to the user's employer, for example. One such window may, according to an embodiment of the present invention, be a portlet 112 that includes all or selected ones of the user's notifications. Such a portlet 112, according to an embodiment of the present invention, may include only a subset of the user's notifications. Such a subset may include a predetermined number of the user's most recent notifications, or any other subset of the user's notifications. Examples of such subsets may include a predetermined number of the user's notifications, filtered according to the priority of the notification, the subject matter of the notification or the generating application, to identify some of the possibilities. A portlet 126 containing a similar subset of the user's notifications may appear on the user's mobile device 108.

Worklists

As illustrated in FIG. 1, all portals and portlets, whether rendered on the user's desktop or mobile device may, according to embodiments of the present invention, provide (Web, for example) links to the next level of notification disclosure: the Worklist. The Worklist, shown at reference numerals 114 and 128 in FIG. 1, may include an inventory or listing of all notices received that require, the user's attention, from all applications. This level of notification disclosure are advantageous, as portals and portlets may not list all of the notifications of the type the user has decided to receive, but only some selectable subset of such notifications (e.g., the five most recent). The Worklist, according to embodiments of the present invention, may provide additional value beyond providing a complete list of the user's notifications and messages. Indeed, operations may be performed with respect to the constituent notifications and messages forming the Worklist. For example, the Worklist may be filtered or otherwise selectively configured to show all notices or show only notices having one or more selected characteristics or only notices of a particular type (e.g., requisitions, payables, status); to show multiple selections of notices (e.g., consecutive, non-consecutive); and/or to show only those messages or notices that require an approve, disapprove, accept, or reject decision, for example. When the user clicks on or otherwise selects one of the constituent notices of the Worklist, such as a notice for a purchase order request, the purchase order request may be presented to the user, as shown at 116 in FIG. 1. Advantageously, the purchase order 116 preferably includes functionality to enable the user to substantively act upon the notice, and in a manner that is appropriate to the received notice. As shown in FIG. 1, the exemplary notice 116 includes an "Approve" button and a "Disapprove" button. Clicking on either of these buttons, according to embodiments of the resent invention, generates a suitably formatted reply to the application or workflow that generated the notice 116. The reply will inform the application or workflow that generated the notice 116 whether the user has approved the purchase order or disapproved the purchase order. In any event, the substantive action (i.e., approving or disapproving the purchase order) may be taken at the level of the portal, without requiring the user to open the notice generating application to respond to the notice. A similar functionality is included in the Worklist 128 that may be rendered on the user's mobile device(s), such as shown at reference numeral 124 in FIG. 1. Indeed, by clicking on or otherwise selecting a constituent notice within the Worklist 128 rendered on the mobile device, the user may cause the mobile device to render the underlying purchase order 130 within the notice generating application and approve or disapprove the requested purchase order from his or her mobile device, without the necessity of authenticating or otherwise navigating to or within the generating application. The ability to act upon a notice regarding a business transaction rendered within a Worklist on a mobile device is significant for users of mobile devices, as users of such devices and the nature of such mobile devices generally demand immediacy in any transactions carried out upon such devices. [As discussed later and shown in FIG. 3, actions (e.g., approve, disapprove) could be taken at the level of the Worklist (e.g., 128) without the rendering of the underlying dialog (e.g., 130) for reasons of immediacy. Although immediacy is primary for mobile contexts, there is nothing in the embodiments of the present invention that would prevent these actions from taken place at the Worklist in general (i.e., 114, 128) as described hereunder.

The notification system 102 may also send all or selected ones of the received messages and notifications as email messages to a thick email client, as shown at 118 and/or to a Web email application, as shown at 120. In any event, the user may click on or otherwise select one of the emails and cause the email application to render the email-containing notice, as shown at 122. The email advantageously includes functionality enabling the user to substantively act upon the subject matter of the email—in this case, a purchase order request. According to embodiments of the present invention, the user may approve or disapprove (and/or any other take any other appropriate and enabled action) the purchase order within the body of the email without having to open the notice generating application and take the same substantive action with respect to this purchase order request at the level of the application. Preferably, embodiments of the present invention include a functionality to clean up redundant notifications from the user's portal, thick or thin email client and mobile device(s) after the user has responded to a notice and the notice-issuing application or workflow has acknowledged receipt of the response.

FIG. 2 shows another example of a portal incorporating aspects of the present invention. As shown therein, the portal 110 may include a plurality of individual windows or portlets containing news, information and links. One such portlet is shown at 112, in which the notices according to embodiments of the present invention are listed. As noted above, only a selectable subset of the user's notifications may be listed in the portlet 112. Clicking or otherwise selecting any of the notices appearing in the portlet 112 brings the user to the next level of progressive disclosure, such as a Worklist or the message or notification itself. Clicking on the More link (114) would take the user specifically to the Worklist, as opposed to the message or notification itself.

FIG. 3 shows an exemplary Worklist accessed through a Web portal, according to an embodiment of the present invention. The Worklist 120 shown in FIG. 3 may display a complete list of the user's notifications (or sequentially display one screen of such notices at a time, for example). The notifications shown in FIG. 3 may be filtered and a drop down menu 304 may provide the user with predefined filters. Alternatively or in addition to the drop down menu of predetermined filters, the user may define his or her own filter. As shown at 301 in FIG. 3 allows the list of notices to be sorted by selection of different attributes or characteristics (e.g., Subject, Sent, Due, Priority) listed as column headers of the Worklist (i.e., toggle between ascending and descending order all notices in the list by that selected header. Different and additional attributes (e.g., Sender, Type) may replace or may be added to the current attributes to provide the user with more contextual information with which to make an informed decision at the current level of progressive disclosure via the customize button such as shown at 302 in FIG. 3. This ability to take an action against a notice at this level of disclosure may prove to be invaluable for mobile deployments where immediacy (i.e., the ability to complete a transaction in a minimal amount of time and motion) is a key or significant requirement.

The present design framework advantageously incorporates the above-discussed attributes of passivity, ubiquity, and progressive disclosure. The example developed herein of a Web portal using the present design framework is passive, as the user chooses whether and when to review the portal contents. It is also ubiquitous, as it could be accessed from any system that can access the Internet (or the enterprise's intranet, if appropriate) or via a mobile device. Finally, the present design framework makes use of progressive disclosure, as the information that is initially provided to the user is the minimum required, with progressively more information being rendered in the Worklist and finally in the underlying document, email or message.

The embodiments of the present invention shown in the drawings and described herein have two levels of progressive disclosure (e.g., a Web link including a general indication of the notification subject matter at the first level and the entire message or notification at the next level). However, other embodiments of the present invention may include more than two levels. For example, a user may not receive all the information needed to make a decision from a subject line alone (e.g., Expense Report W5016513 Requires Your Approval) in a Web portal; on the other hand, information regarding every aspect of that subject (e.g., a list of every item for a $50.00 office supply expenditure) may not be required to make a definitive decision (e.g., approve, disapprove) relative thereto.

Figure 4:
FIG. 4 shows an exemplary notice accessed through a worklist within a Web portal, according to an embodiment of the present invention.

The level of disclosure and functionality presented at the Worklist level of a Web portal may also be presented in the next level of disclosure. This next level of disclosure may be selected by the user if more information about the notice were needed in order to make an informed decision regarding that notice. This level of disclosure may display additional information regarding the notice or all of the available information regarding the notice. FIG. 4 presents an example of this level of disclosure for a notice in a Web application that generated the notification. The Home, Individual, and Work tabs shown in FIG. 4 imply that this level of notification is also within the Web portal. This need not necessarily be the case. This level of the notification could be within the application that generated the notification. According to an embodiment of the invention, the user may be taken directly to the application page where this action (e.g., approve, disapprove) could be taken by simply selecting a link in FIG. 3 and without having to authenticate himself or herself (e.g., login) to the application because authentication of the user was acquired at the Web Portal or email level and passed to the application on behalf of the user.

As shown, the notice of FIG. 4 may include a details portion 410, where an explanation or a justification of the requested action (for example) may be presented. In this case, the justification is that the requisition is to purchase computer hardware supplies to replace an older computer. The notice may include attached documents that support or otherwise document the requested action or is somehow relevant to the notice, as shown at 408. Again, the recipient of the notice may select an approve button 402, a disapprove button 404 or even a reassign button 406, if the requested decision is to be reassigned (e.g., delegated) to another identified party. The notice may include other buttons instead of the approve and disapprove buttons, such as Yes, No, Accept, Reject to name a few possibilities.

Similarly, the level of disclosure and functionality presented in the Worklist level of a Web portal may be presented through a desktop or Web based email system or on a mobile device. The actual body of a message in the email could present the attributes of the notice (e.g., date sent, purpose, sender), as well as the ability to respond to the notice (e.g., approve, disapprove). FIG. 5 illustrates an example of a notice in an email message 500, according to an embodiment of the present invention. Such a notice may have originated in a workflow, sent to the notification system 102, formatted as an email and sent via email to the intended recipient of the notice. Links 502 and 504, when selected, are effective to cause a properly formatted answer message to be sent back to the notice-originating application (such as a workflow, for example), either approving or disapproving the underlying substantive request in the notice.

FIG. 6 is a representation of a system for non-interrupting notifications, according to an embodiment of the present invention. In the example shown, three applications 602, 604 and 606 are coupled to the notification server 608 and each application is configured to send its notifications to the notification server 608. The notification server, in turn, may be configured to send the notifications to the user's desktop computer (such as to a portlet in the portal, for example), as shown at 612, to the user's Web mail account, and to one or more of the user's mobile devices over a network 610. The network 610 may include the Internet, for example. The user may be given control over the manner in which his or her notices are published. For example, the user may subscribe one or more devices or services to receive notifications by the notification server 608 and the server 608 may thereafter publish the received notifications only to those devices and/or services having subscribed to receive such notices.

The body of such notifications, however formatted, may include functionality enabling the user to substantively act upon the received notification and carry out a business transaction without logging into or otherwise accessing the notification-originating applications 602, 604 and/or 606. Likewise, a workflow may span across all or selected ones of the applications 602, 604 and/or 606 and generate notices that are sent to the notification server 602. Thereafter, the notification server 608 may send the notifications to the user in as many forms as the user specifies and/or in as many forms as are configured to receive notices from the notification server 602.

The user, upon receiving a notification from such a workflow, need not log into any of the applications 602, 604, 606, but need only respond thereto in the manner described above to send or cause to be sent a reply to the notice, to enable the workflow to executing its business function.

For example, a workflow may be initiated upon the occurrence of some business event, such as promoting someone to a hierarchically higher position within the enterprise. Such a workflow may well span all three applications 602, 604, 606, in that the workflow may include a procurement request to the Procurement Application 1 for a new desk and/or office for the person promoted. The workflow may also include a request to the human resources Application 2, to confirm the promoted person's new title, for example. Likewise, the workflow may also include a call to a Finance Application 3 to confirm the person's new salary, for example. Each application called on by the workflow may generate one or more notifications to one or more persons authorized to approve requests or confirmed some information. Each such notifications may advantageously be sent through the notification server 608 to the intended recipient in the form of a link on a portlet, an entry on a Web Email application, a thick email client, or as a notice on the user's or users' mobile device(s) in the manner discussed above and shown in the drawings. Upon responding to each notification, the notification issuing application may be updated to reflect the action taken by the user (e.g., approve, disapprove, accept, do not accept, yes, no, etc.).

Hardware Description

Figure 7:
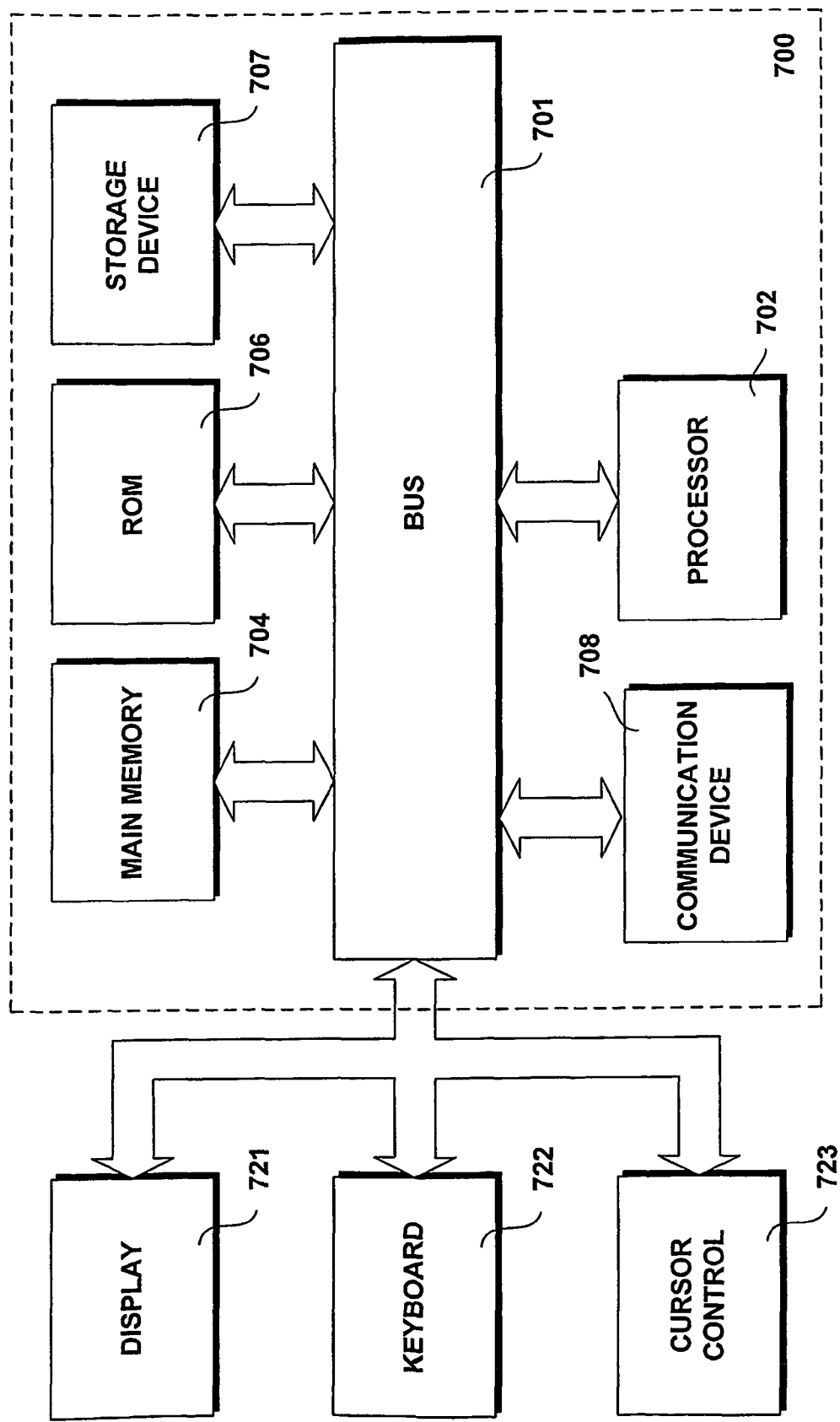
FIG. 7 is a block diagram of a computer with which the present invention may be practiced.

FIG. 7 illustrates a block diagram of a computing device 700 with which an embodiment of the present invention may be implemented. Computing device 700 includes a bus 701 or other communication mechanism for communicating information, and a processor 702 coupled with bus 701 for processing information. Computing device 700 further comprises a random access memory (RAM) or other dynamic storage device 704 (referred to as main memory), coupled to bus 701 for storing information and instructions to be executed by processor 702. Main memory 704 also may be used for storing temporary variables or other intermediate information during execution of instructions by processor 702. Computing device 700 may also include a read only memory (ROM) and/or other static storage device 706 coupled to bus 701 for storing static information and instructions for processor 702. A data storage device 707, such as a magnetic disk or optical disk, may be coupled to bus 701 for storing information and instructions. A communication device 708, such as a modem or network (such as Ethernet, for example) card may be also coupled to the bus 701 to provide access to a network.

The computing device 700 may also be coupled via bus 701 to a display device 721, such as a cathode ray tube (CRT), for displaying information to a computer user. An alphanumeric input device 722, including alphanumeric and other keys, is typically coupled to bus 701 for communicating information and command selections to processor 702. Another type of user input device might be the user's own voice or cursor control 723, such as a mouse, a trackball, or cursor direction keys for communicating direction information and command selections to processor 702 and for controlling cursor movement on display 721. The computing device 700 may be or include, for example, a computer or a mobile device such as a pager, a wireless telephone or a personal digital assistant (PDA), to identify a few possibilities. However, such a list is not intended to be all-inclusive, as those of skill may recognize.

The present invention is related to the use of computing device 700 configured to process notifications according to the present invention, as disclosed above. According to one embodiment, the processing may be carried out by one or more computing devices 700 in response to processor(s) 702 executing sequences of instructions contained in memory 704. Such instructions may be read into memory 704 from another computer-readable medium, such as data storage device 707 and/or from a remotely located server. Execution of the sequences of instructions contained in memory 704 causes processor(s) 702 to implement the functionality described above. In alternative embodiments, hard-wired circuitry may be used in place of or in combination with software instructions to implement the present invention. Thus, the present invention is not limited to any specific combination of hardware circuitry and software.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any express definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of processing notifications issued by a plurality of computer processes, at least some of the notifications notifying a user of a business event that requires the user to make a decision, the method comprising the steps of:

providing a notification server, coupling the notification server to the plurality of computer processes and enabling a user device of the user to couple to the notification server over a network, the notification server being configured to receive the notifications from the plurality of computer processes;

receiving the notifications in the notification server over the network;

providing a notification application running on the notification server, the notification application being configured to process the received notifications and enable user interaction with the processed notifications over the network via the user device;

filtering, by the notification application, the received notifications to identify those of the received notifications that require a decision from the user;

coupling the user device to the notification application;

causing links to the identified notifications to be displayed on the user device by the notification application;

receiving a user interaction from the coupled user device indicating a selection by the user of one of the displayed links to the identified notifications;

displaying, on the coupled user device, the received notification that corresponds to the selected link;

requesting that the user make a decision relative to the displayed notification and sending the decision from the user device to the notification application over the network;

generating a reply to the displayed notification within the notification application and according to the decision made by the user;

formatting the generated reply according to the computer process of the plurality of computer processes that issued the displayed notification, and sending, over the network, the formatted reply from the notification application to the computer process that issued the displayed notification, without requiring the user to log onto the computer process that issued the displayed notification.

2. The method of claim 1, wherein the link displaying step displays the links in a portal.

3. The method of claim 1, wherein the link displaying step is carried out with the user device being a mobile device.

4. The method of claim 1, wherein the link displaying step displays a link to each of the received notifications.

5. A computer system for processing notifications issued by a plurality of computer processes, at least some of the notifications notifying the a user of a business event that requires the user to make a decision, comprising:

a network;

a notification server coupled to the network and configured to receive the notifications from the plurality of computer processes over the network;

a user device configured to couple to the notification server over the network;

a notification application running on the notification server, the notification application being configured to process the received notifications and enable user interaction with the processed notifications over the network via the user device;

a plurality of processes spawned by at least one of the notification server and the user device, the processes including processing logic for:

receiving the notifications over the network;

filtering, by a notification application running on the notification server, the received notifications to identify those of the received notifications that require a decision from the user;

causing links to the identified notifications to be displayed on the user device by the notification application;

receiving a user interaction from the coupled user device indicating a selection by the user of one of the displayed links to the identified notifications;

displaying, on the coupled user device, the received notification that corresponds to the selected link;

requesting that the user make a decision relative to the displayed notification and sending the decision from the user device to the notification application over the network;

generating a reply to the displayed notification within the notification application and according to the decision made by the user;

formatting the generated reply according to the computer process of the plurality of computer processes that issued the displayed notification, and sending, over the network, the formatted reply from the notification application to the computer process that issued the displayed notification, without requiring the user to log onto the computer process that issued the displayed notification.

6. The computer system of claim 5, wherein the link displaying step displays the links in a portal.

7. The computer system of claim 5, wherein the displaying step is carried out with the user device being a mobile device.

8. The computer system of claim 5, wherein the link displaying step displays a link to each of the received notifications.

9. A non-transitory machine-readable storage medium having data stored thereon representing sequences of instructions which, when executed by a computing device, causes said computing device to process notifications issued by a plurality of computer processes, at least some of the notifications notifying the user a user of a user device of a business event that requires the user to make a decision, by performing the steps of:

coupling the computing device to the plurality of computer processes over a network and enabling the user device to couple to the computing device over a network;

configuring the computing device to receive the notifications over the network;

receiving the notifications in the computing device;

filtering, by a notification application running on the notification server, the notifications received by the notification server to identify those of the received notifications that require a decision from the user, the notification application being configured to enable user interaction with the filtered notifications over the network via the user device;

causing links to the identified notifications to be displayed on the user device, by the notification application;

receiving a user interaction from the coupled user device indicating a selection by the user of one of the displayed links to the identified notifications;

displaying, on the coupled user device, the received notification that corresponds to the selected link;

requesting that the user make a decision relative to the displayed notification and sending the decision from the user device to the notification application over the network;

generating a reply to the displayed notification according to the decision made by the user;

formatting the generated reply according to the computer process of the plurality of computer processes that issued the displayed notification, and sending, over the network, the formatted reply from the notification application to the computer process that issued the displayed notification, without requiring the user to log onto the computer process that issued the displayed notification.

10. The non-transitory machine-readable storage medium of claim 9, wherein the link displaying step displays the links in a portal.

11. The non-transitory machine-readable storage medium of claim 9, wherein the user device is a mobile device.

12. The non-transitory machine-readable storage medium of claim 9, wherein the link displaying step displays a link to each of the received notifications.

13. A method for a mobile device to process notifications issued by a plurality of computer processes, at least some of the notifications notifying a user of the mobile device of a business event that requires the user to make a decision, the method comprising the steps of:

providing a notification server that is selectively accessible to the mobile device over a network and that is configured to receive and process the notifications from the plurality of computer processes over the network;

receiving, by the notification server, the issued notifications;

providing a notification application running on the notification server, the notification application being configured to process the received notifications and enable user interaction with the processed notifications over the network via the mobile device;

filtering, by the notification application, the notifications received by the notification server to identify those of the received notifications that require a decision from the user;

causing links to the identified notifications to be displayed on the mobile device;

sending, from the mobile device to the notification application, a user interaction indicating a selection by the user of one of the displayed links to the identified notifications;

displaying on the mobile device the received notification that corresponds to the selected link;

requesting that the user make a decision on the mobile device relative to the displayed notification and sending the decision from the mobile device to the notification application over the network;

generating a reply to the displayed notification within the notification application according to the decision made by the user;

formatting the generated reply according to the computer process of the plurality of computer processes that issued the displayed notification, and sending, over the network, the formatted reply from the notification application to the computer process that issued the displayed notification, without requiring the user to log onto the computer process that issued the displayed notification.

14. The method of claim 13, wherein the link providing step displays the links in a portal accessible to the mobile device and to the user.

15. The method of claim 13, wherein the link displaying step provides a link to each of the received notifications.

* * * * *